United States Patent [19]

Greenberg et al.

[11] Patent Number: 5,635,237
[45] Date of Patent: Jun. 3, 1997

[54] METHOD OF MANUFACTURING SUBSTANTIALLY PURE RAWHIDE PET PRODUCTS

[75] Inventors: Stuart Greenberg, Ossining, N.Y.; Guy Fere, Unleux, France; Albertine Sharples, Centro, Brazil

[73] Assignee: Rawhide Select, Ossining, N.Y.

[21] Appl. No.: 381,590

[22] Filed: Jan. 31, 1995

[51] Int. Cl.⁶ ............................ A23K 1/00; A23P 1/00
[52] U.S. Cl. ................... 426/646; 426/284; 426/516; 426/805
[58] Field of Search .......................... 426/646, 516, 426/284, 635, 805, 641

[56] References Cited

U.S. PATENT DOCUMENTS

| | | | |
|---|---|---|---|
| 3,525,124 | 8/1970 | Ocker | 425/204 |
| 3,843,757 | 10/1974 | Ehrenfreund et al. | 425/204 |
| 4,260,635 | 4/1981 | Fisher | 426/3 |
| 4,702,929 | 10/1987 | Lehn et al. | 426/635 |
| 5,047,231 | 9/1991 | Spanier et al. | 424/57 |
| 5,149,550 | 9/1992 | Mohilef | 426/3 |

FOREIGN PATENT DOCUMENTS 2194125  3/1988  United Kingdom ............ 426/805

Primary Examiner—George Yeung
Attorney, Agent, or Firm—Kalow, Springut & Bressler

[57] ABSTRACT

A substantially pure rawhide product and a mechanical method for manufacturing a substantially pure rawhide treat or chew for pets utilizing a double screw extruder with a number of heating zones and interchangeable extrusion dies. The method allows for the use of wet rawhide or rawhide scraps and contemplates the addition of various additives to the rawhide product. Also claimed is a double screw extruder especially adapted for the preparation of substantially pure rawhide treats.

16 Claims, 4 Drawing Sheets

METHOD OF MANUFACTURING SUBSTANTIALLY PURE RAWHIDE PET PRODUCTS

FIELD OF THE INVENTION

This invention relates to a method for the manufacture of substantially pure rawhide snacks and chews for pets, especially for dogs and cats, from rawhide scraps and rawhide.

BACKGROUND OF THE INVENTION

Pet chews and snacks can be manufactured by treating byproducts from cattle and other animals to produce hardened substances which resemble bone and are enjoyable and healthful for pets to chew on. The pet chew manufacturing industry has long sought an efficient method for manufacturing pet chews which results in a substantially pure rawhide product,(i.e., without the disadvantages of substantial fillers, as detailed below) allows the addition of various flavorings, colorings and other additives and enables the configuration of the pet chew in various shapes and sizes that are attractive to the pet and the pet owner.

It has also long been desired to achieve a rawhide pet chew product by utilizing rawhide scraps, which are the by-products of the manufacture of other rawhide products. Often the scraps amount to 50% of the total output, yet today must be discarded as waste or used in a much less valuable fashion, such as glue manufacture. The scraps are often chemically treated and present disposal problems. A process for utilizing rawhide scraps would save money and minimize waste.

Rawhide is a byproduct of the slaughter of hoofed animals and consists of the hide, tendons etc. of the animal. Rawhide contains about 65–70% water, 30–35% dry material and less than 1% ash. The dry material is largely made up of fibrous proteins, collagen, keratin, elastin and reticulin. Due to this high water content, previously known methods of processing rawhide required that the rawhide be dried before it is used to produce pet chews.

Early methods of manufacturing pet chews out of substantially pure rawhide are as simple as preparing and drying rawhide strips until they are hard and bonelike. These nonmechanical methods consist of preparing the rawhide by removing, either chemically or otherwise, the fat and hair found on the cattle ligaments and other material which comprise the raw starting material. The treated rawhide is then cut and rolled into the desired shape, such as a rope or strip and dried. Coloring and flavor additives are applied to the chew by coating the outside of the rawhide strip once dry.

One of the simple methods requires drying the cut rawhide in the sun, before the rolling step, in order to preserve the rawhide. Prior to the rolling process, the dried rawhide is dipped in water, making it soft and easier to roll. The rawhide therefore needs very little drying once rolled. However, this drying process results in yellow or brown bones which are unappealing to pets and their owners.

Another nonmechanical method consists of working with the rawhide in the wet state, possibly wringing them out before processing. The rawhide is cut and rolled in the wet state.

The nonmechanical "clean, cut and dry" methods of producing pet chews are unsatisfactory since they are labor and energy intensive and time consuming. The methods are labor intensive because the treated skins are sorted depending on their size, laid out, cut into big strips, distributed to the workers who roll them into bones, placed on trays, shipped to the ovens and turned over once a day until dry. There are also problems with quality control. Because of all the manual work involved, the percentage of 'seconds' and rejects is unreasonably high when compared to machine made products.

These methods are energy intensive because the rawhide has to be dried slowly once rolled to obtain a hard (15% moisture content) product. Slow drying is necessary because of the risk of cooking the rolled product into gelatin. Typically the drying process can last up to 15–20 days, starting off with a very low temperature (approximately 50° C.) and gradually reaching 80° C. The drying involves electric fans and wood heated air, turning 24 hours a day.

Further, the addition of additives is limited or not feasible through these methods. Coating the outside of the strip is unsatisfactory since there is no way to disperse the additive throughout the remainder of the chew. Also, it is difficult to mold the rawhide strip so it mimics natural bone or other shapes attractive to pets and their owners.

Illustrative of the above discussed nonmechanical method for manufacturing rawhide chews is U.S. Pat. No. 5,149,550 to Mohilef (1992), which teaches the manufacture of pet chews by (i) washing ligaments from cattle and other hoofstock in an aqueous degreasing solution or roasting, thereby rendering the ligaments substantially free of fat, and (ii) drying until hard.

U.S. Pat. No. 5,047,231 to Spanier et al., (1991) discloses a process for preparing rawhide by adding an inorganic pyrophosphate compound to rawhide strips and then drying the rawhide. The resultant pyrophosphate coated product, when chewed by the dog, results in reduced tartar accumulation on the dog's teeth.

Since the nonmechanical method of producing rawhide pet chews failed to satisfy the industry needs, the art turned to mechanical methods of manufacturing pet chews from rawhide. One mechanical method is to mechanically grind the rawhide fibers or the rawhide starting material. However, this method has failed to provide a solution since in order to mold the rawhide fibers after grinding it is necessary to add a filler, such as flour, starch or gelatin, to bind the rawhide fibers together.

A pet chew which is part filler fails to satisfy a pet since it will come apart in the pet's mouth. In comparison, a substantially pure rawhide pet treat will last much longer than a treat consisting of rawhide and fillers. The whole point about rawhide bones is (a) they have a natural appealing taste, and (b) they are hard enough to chew for a long time. The reason rawhide chews last for a long time is that they are all one piece and not lots of little crumbs glued together with fillers, such as gelatin or starch, which are easily dissolvable in dog saliva. Mechanical methods have never been able to reconstruct the rawhide's consistency because of the necessity of fillers.

U.S. Pat. No. 4,260,635 to Fisher (1981), discloses an example of a mechanical method of processing rawhide treats that requires filler. Fisher discloses a food system product consisting of multiple layers of pet food and supporting fibers, including cellulose or rawhide. Fisher teaches treating cattle skin or other skin parts and then grinding them into meal. The meal is combined with an appropriate binder, such as starch, and then the mixture is molded into a suitable shape. The molded shapes are subsequently subjected to pressure or a combination of pressure and heat so that the product assumes the shape of the mold and becomes a solid mass. This method of manufacturing pet chews does not solve the problem of mechanically manufacturing a substantially pure rawhide pet chew because it requires binders.

U.S. Pat. No. 4,702,929 to Lehn et al. (1987) discloses a method for processing rawhide or rawhide scraps which requires first dehydrating the wet scraps by a frame filter or piston press or by natural drying. After the scraps are dried, they are minced or ground into pieces as small as 3–6 mm. The ground rawhide scraps are then mixed with one or more binding materials, chosen from a group of starches, flours or grains. Coloring and flavoring additives may be added to the mix. The scrap/binder mixture is then extruded through a number of heating zones and then a die. Depending on the quality of the rawhide scrap, the resulting chew consists of 20–60 percent binder (see FIG. 2). However, Lehn et al. fails to disclose a process which results in a substantially pure rawhide treat, relying instead on the starch binders which the present invention avoids. Further, the drying and grinding steps are both energy and time consuming.

In contrast to the above discussed prior art, the present invention utilizes scrap rawhide, produces a substantially pure rawhide product without starch and other binders, allows the simple addition of flavors and colorings to the entire body of the pet chew and is energy and labor efficient.

The present invention is also capable of producing, through the use of two double screw extruders and a coextrusion die, a pet chew product which consists of a tube-like outer shell of substantially pure extruded rawhide filled with a soft filling, also made of substantially pure extruded rawhide. Because of the extraordinary nature of the inventive process, both the shell and the filling are free from fillers and will therefore last much longer than the previously available pet chews. In addition, additives and flavorings can be added separately to both the shell and the filling, in order to enhance the pet's enjoyment of the treat.

SUMMARY OF THE INVENTION

The present invention is an efficient mechanical method for manufacturing a substantially pure rawhide treat from rawhide scraps or rawhide through the use of a double screw extruder and a number of heating zones. The double screw extruder and application of heat breaks down rawhide fibers by shearing, kneading and mixing those fibers and transforms the fibers into an end product which is substantially pure rawhide and thus free from the fillers necessary in the prior art methods. The method allows the addition of various additives to the product and results in an end product with the desired additives dispersed throughout the body of the chew. The inventive method results in a pet chew which can be shaped and molded, yet is free of fillers or binders that were necessary to bind the rawhide in prior art mechanically manufactured pet chews.

A primary object of the present invention is to provide an efficient method of using scrap to produce rawhide pet chews without the binders and fillers required in previously known methods of manufacture.

Another object of the present invention is to provide a labor and energy efficient mechanical method of producing rawhide pet chews and produce the product more economically than the prior art methods of manufacture.

A further object of the present invention is to provide a method of manufacturing substantially pure rawhide pet chews which allows the easy addition of flavoring, coloring and other additives to make the product more desirable to the pet.

Another object of the present invention is to provide a mechanical method of producing rawhide pet chews which avoids the drying and grinding pre-steps of the previously known methods of manufacture.

A further object of the present invention is to allow the production of rawhide pet chews from a starting product of "wet" rawhide scrap or rawhide.

Another object of the present invention is to achieve a rawhide pet chew product by utilizing rawhide scraps, which are oftentimes discarded as waste.

Another object of the present invention is to provide a process to manufacture a pet chew product which consists of a tube-like outer shell of substantially pure extruded rawhide filled with a soft filling, also made of substantially pure extruded rawhide or other materials.

The invention will be better understood by reference to the following detailed description taken in conjunction with the accompanying drawings.

DETAILED DESCRIPTION OF THE PREFERRED EMBODIMENTS

While the invention will be described in connection with a preferred embodiment, it will be understood that it is not intended to limit the invention to the described embodiment. On the contrary, it is intended to cover all alternatives, modifications and equivalents as may be included within the spirit and scope of the invention as defined by the appended claims.

The starting material of the method of the instant invention is rawhide scraps which, as described above, contain approximately 70% water. Through the shearing, mixing and heating processes carried out in the method of the instant invention, this rawhide starting material is transformed into a soft, water containing rawhide substance with a consistency similar to pasta. The rawhide starting material is transformed so that it forms a coherent mass of rawhide which can be dried and cut into acceptable lengths and shapes. Thus, the instant invention avoids the use of fillers and binders previously necessary in the prior art methods of mechanically manufacturing rawhide products.

Figure 1:
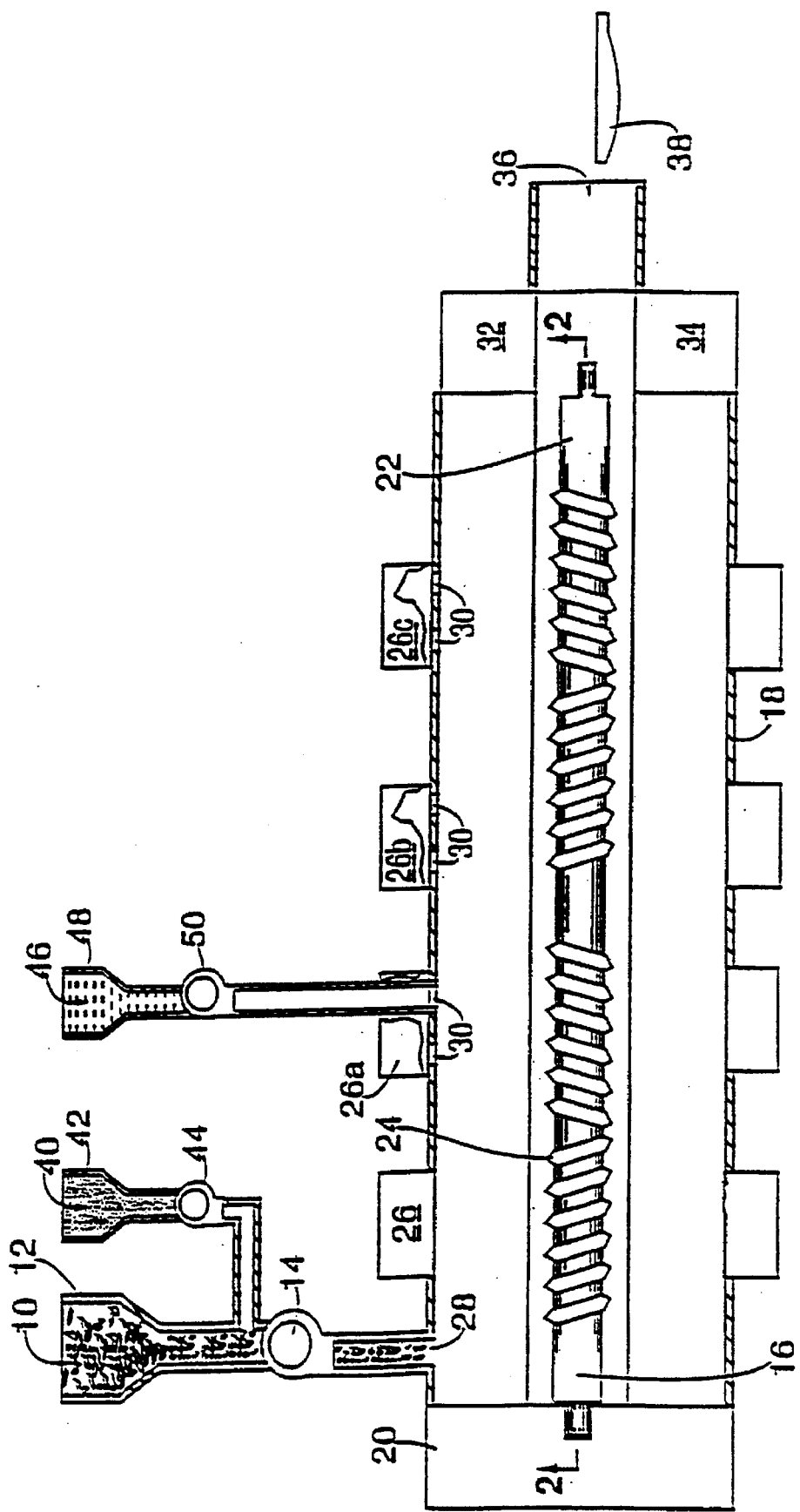
FIG. 1 is a cross-sectional diagram of one embodiment of the extruding machine and feeding mechanisms utilized in carrying out the method of the present invention.

FIG. 1 is a simplified diagram of the equipment used to process rawhide scraps by the inventive process. The inventive method can be carried out in a machine known as a twin-screw cooker extruder. The equipment utilized in the presently preferred embodiment of the inventive method is a twin screw extruder which includes a number of heating zones set up sequentially along the path of the extrusion of the rawhide. One type of extruding machine capable of being adapted for use with the present inventive method is the Twin-Screw Cooker Extruder, Models BC 45, 72 and 92, all available from Clextral, Inc. Any twin-screw cooker extruder may be utilized in performing the method of the present invention.

As illustrated in FIG. 1, rawhide scraps or rawhide 10 are stored in a container 12 for continuous feeding during the carrying out of the inventive process. Preferably the container 12 is constructed of stainless steel.

The rawhide goes through a well known preliminary treatment at the tanneries to remove the hairs of the whole skins, using various known chemicals, to take off the fat and leftover meat. The rawhide is cleaned of the chemicals by the addition of peroxide and whitened.

One type of rawhide utilized in the present invention is the chemically processed rawhide which is not of sufficient size to be used in conventional pet chew production methods or scrap. Another source of scrap rawhide is the waste pieces left over from the conventional pet chew production methods. As discussed above, the scrap rawhide is usually discarded or used in some uneconomical application.

In the inventive method the scrap rawhide 10 is used "wet", that is, without drying or pressing to remove the water as done in the prior known methods. While it is possible to dry or press the scrap rawhide 10 before use, that step is time and energy consuming and is not necessary to carry out the process of the instant invention.

The scrap rawhide 10 is fed through the pump 14 to the extruder. A pump 14 is used to feed the extruder with scrap rawhide 10. The pump 14 is preferably a gear pump, single screw extruder or double screw extruder which insures that the scrap rawhide 10 is fed at a sufficient rate under pressure. The pump 14 should preferably be adjustable in consideration of the weight of the scrap rawhide 10 to be delivered.

The preferred pump 14 is a gear pump or a multilobe pump, such as that commercially available from Blentech. This pump 14 is capable of constantly feeding the rawhide to the double screw extruder with at least 5 bar of pressure (1 bar equals approximately 14.5 psi). Preferably the pump is driven by a variable speed motor in order to vary the feed rate based on the consistency of the rawhide.

An important part of the extruder is a pair of similar or identical co-penetrating screws 16. These screws 16 rotate inside a fixed shell or barrel 18.

The screws 16 are rotated through an assembly 20 which comprises any conventional device for varying the speed of the rotation of the screws 16. Assembly 20 preferably comprises a variable speed motor (electric or hydraulic), a speed reducer and a high torque compact gear box with two co-rotating output shafts (not shown).

The main functions of the twin screws 16 are to convey the rawhide 10 through the machine, to mix and knead the rawhide under pressure and for shearing the rawhide.

Figure 2:
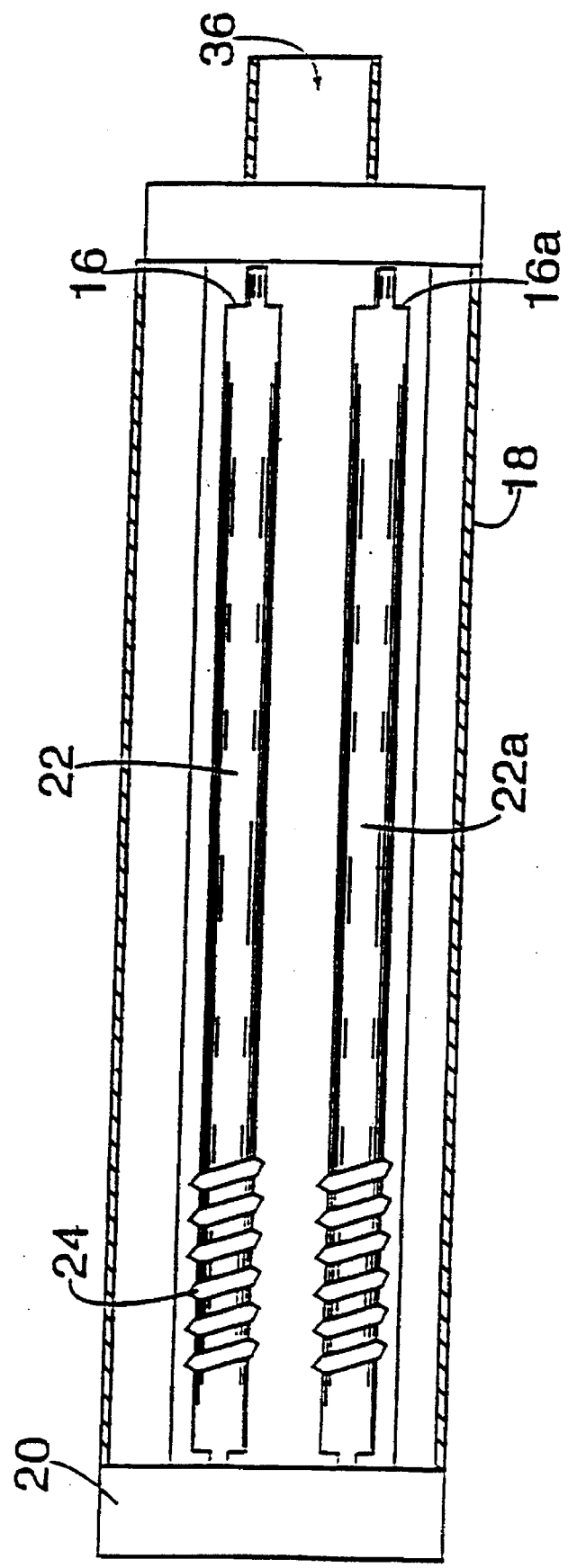
FIG. 2 is a cross-sectional top view of the twin screws of the extruder machine illustrated in FIG. 1 at line 2—2.

FIG. 2 illustrates an overview of the twin screws 16 and 16a of the double screw extruder. The screws 16 are configured to include a set of modular disc elements 24 assembled on one pair of shafts 22. The shafts are splined, i.e., provided with a series of uniformly spaced ridges parallel to their axes. The modular disc elements 24 are provided with corresponding grooves in order to allow the fixing of the mixing disc elements to the shaft and to ensure the transfer of torque from the shaft to the discs. This splined setup also allows the interchange of various sized and shaped mixing disc elements 24.

The disc elements 24 are available in various sizes and shapes. The availability of the modular disc elements 24 permits the manipulation of the screw profile and allows the user to develop screw profiles for a series of operations, i.e. shearing, mixing, kneading. This modularity also allows the user to vary the screw profile along the length of the screw shaft in order to change the process being performed at various locations along the screw.

Various types of modular mixing disc elements 24 can be used in the inventive process. Mono- and bilobal discs are available for use, but were found to be less effective in sufficiently shearing and mixing the rawhide starting material. The best results for producing a substantially pure rawhide product were found using "mell" mixing discs and reverse screw discs (explained below).

A reverse screw disc element is a disc element with a negative pitch. A reverse screw disc element tends to drive the raw material in reverse, i.e., away from the exit of the twin screw extruder barrel. For that reason, the reverse screw disc element typically contains slots which allow the raw material to flow forward as it is mixed.

Figure 3:
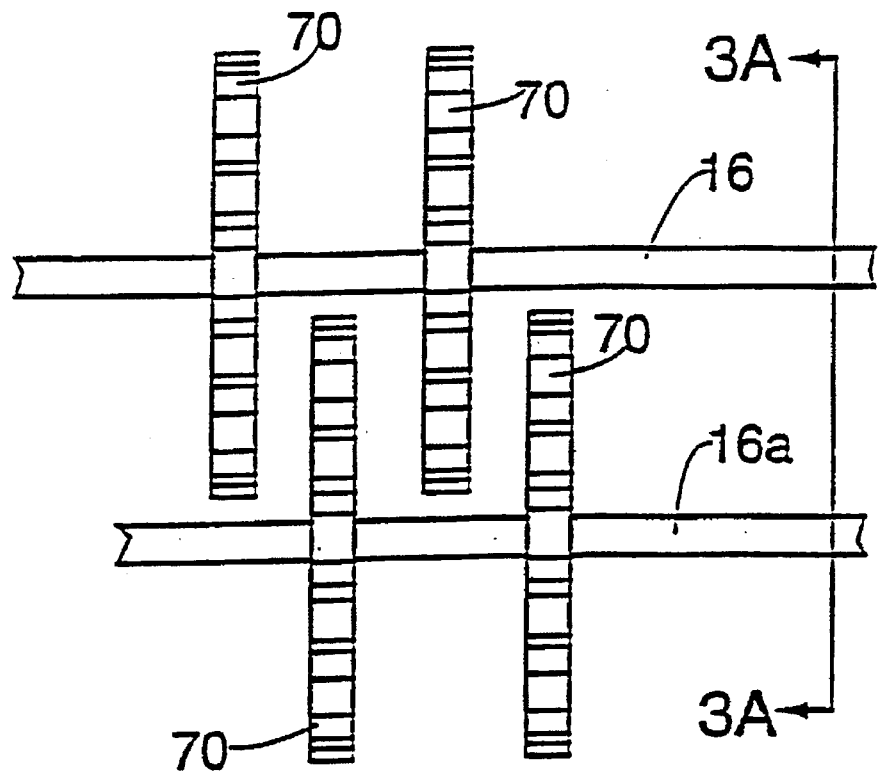
FIG. 3 is an over-view of a portion of a particular screw shaft disc configuration made up of "mell" screw disc elements on a pair of "splined" shafts.
Figure 3A:
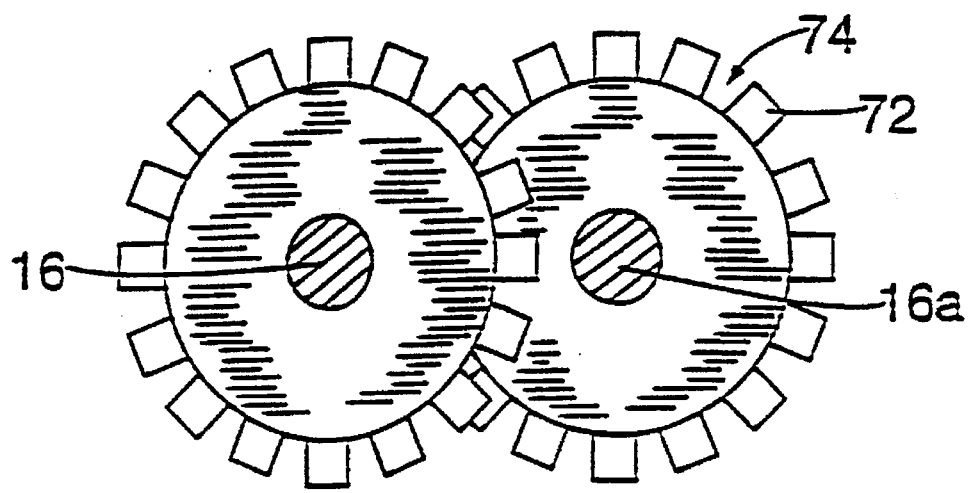
FIG. 3a is a front view of the screw shaft configuration of FIG. 3.

"Mell" mixing disc elements are illustrated in FIGS. 3 and 3a. The mell mixing disc elements 70 are attached to the screw shafts 16 and 16a by grooves on the inside of the elements which correspond to ridges on the shafts 16 and 16a. The mell mixing disc elements 70 are placed in a staggered configuration to allow the rawhide starting material to move through the disc elements.

FIG. 3a is a front view of the mell mixing disc elements 70 shown on shafts 16 and 16a. The mell mixing disc elements 70 are provided with teeth 72 around the entire circumference of the disc 70. The teeth 72 are spaced so that they form slots 74. The slots 74 shear and mix the rawhide starting material and enable the material to travel through the discs.

The screws 16 are also adaptable in terms of shape, length and pitch in order to optimize the rawhide product quality and extruder output. One preferred screw profile utilized to shear and mix the starting material into a consistency which is then formed into a pet chew product of substantially pure rawhide is a screw profile with two intense mixing zones of mell mixing discs and a reverse section. A sample preferred screw profile configuration is provided below:

| | SCREW CONFIGURATION | | |
|---|---|---|---|
| Modular Element Number | Length (mm) | Pitch (mm) | Type of Screw Element |
| 1 | 200 | 66 | T2F |
| 2 | 100 | 50 | C2F |
| 3 | 100 | 35 | C1F |
| 4 | 150 | 25 | C1F |
| 5 | 100 | 15 | C1F |
| 6 | 100 | MELL | MIXING DISC |
| 7 | 50 | −15 | REV 3 × 10 |
| 8 | 100 | 25 | C1F |
| 9 | 100 | 15 | C1F |
| 10 | 100 | MELL | 2 SPL NEG REV 3 × 10 |
| 11 | 50 | −15 | REV 3 × 10 |
| 12 | 50 | 15 | C1F |

Figure 4:
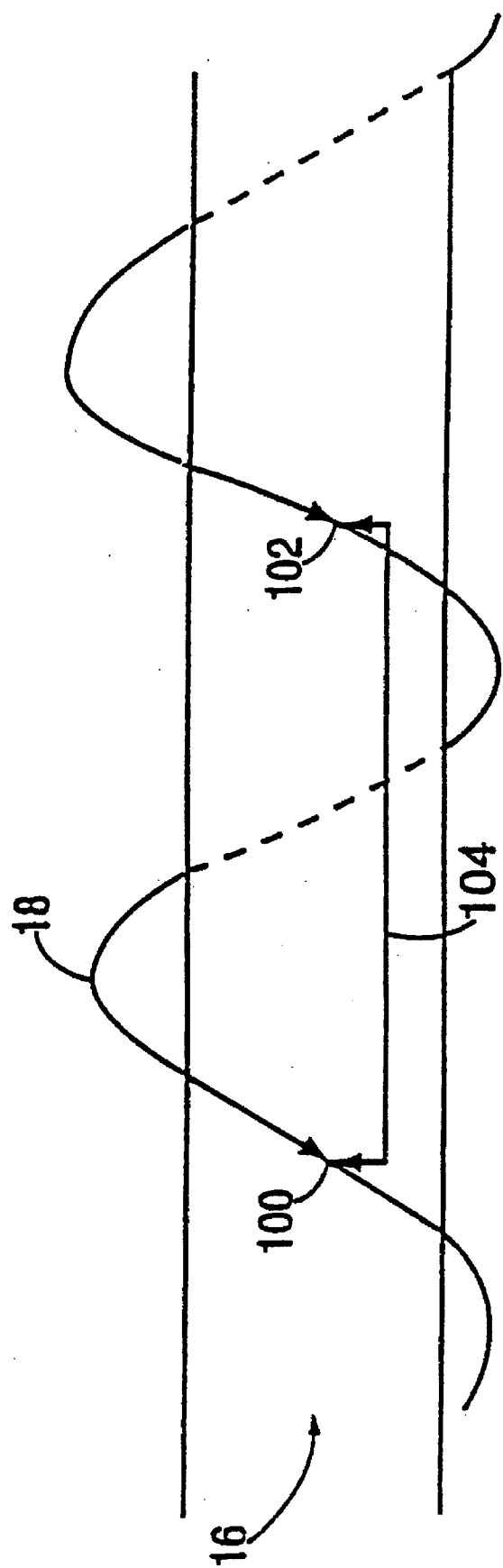
FIG. 4 is a side view of a portion of a screw shaft illustrating the concept of "pitch."

This screw configuration was used in the Examples disclosed at the end of this specification. The "length" of the screw elements is the length of the screw element along the shaft. For example in the above configuration, the first screw element is 200 mm long. Adding up the lengths of all the screw elements provides the total barrel length, in this case 1200 mm. The "pitch" of the screw element is the distance (in mm) from one point of the screw to its horizontal equivalent one sphere ahead. The lower the pitch the tighter the screw, resulting in higher pressure on the rawhide being processed. The pitch is illustrated in FIG. 4. In FIG. 4, the screw element 98 is affixed to shaft 16 and covers a length of shaft 16. The pitch is illustrated by the horizontal distance 104 between points 100 and 102. In a reverse disc (identifiable in the chart above as having a negative pitch (elements 7 and 11)), the orientation of the screw element is in the opposite direction as discussed above.

The types of screw elements in the screw configuration chart above are all standard screw elements under their designated names as available commercially from Clextral, Inc. T2F is a trapezoidal double flight, C2F is a conjugated double flight and C1F is a conjugated single flight. REV 3×10 is a reverse flight with three slots of 10 mm diameter. 2 SPL Neg is a mell mixing disc.

In the illustrative screw configuration of the chart above, modular element nos. 1–5 carry the starting raw material through the initial heating zones and begins to compress the starting rawhide material. Modular element no. 6 is a mell disc and no. 7 is a reverse disc. These modular elements are used to shear, mix and knead the rawhide. Modular element nos. 8 and 9 act to further carry the rawhide along the heating zones and further compress the material. Modular element nos. 10 and 11 comprise another heating and mixing zone in which a second mell disc (element no. 10) and a second reverse disc (element no. 11) act to shear, mix and knead the material. The final modular element no. 12 insures that the extruder has enough force to push the material through the die.

As illustrated in FIG. 1, placed sequentially along the barrel 18 are a number of heating zone modules 26, 26a, 26b, 26c, etc. There can be any number of heating zone modules 26. These modules 26 are maintained at specific temperatures and act to heat the rawhide 10 as it is conveyed along the screws 16. This heating action, combined with the mixing and shearing action of the twin screws, acts to transform the starting scraps of raw material into a coherent mass.

The heating zone modules 26 are preferably capable of temperatures up to at least 300° C. continuously and capable of being controlled within an accuracy of ±2° C. Preferably the heating zone modules 26 are heated by induction or resistance heating and the temperature is controlled by means of water arranged in a cooling circuit.

The illustrative preferred twin-screw cooker-extruder has a barrel length of 1500 mm, but other barrel lengths are feasible for extruding substantially pure rawhide. The preferred barrel 18 has five (5) or six (6) 300 mm heating zone modules 26 assembled to each other with a clamp collar. Each of the modules 26 is provided with a thermocouple. Preferably the heating zone modules are provided with either an induction coil or a resistance heater. The induction coil is preferred because it provides fast heating and the ability to introduce intense precise zone heating.

Each of the heating modules 26 is preferably provided with an internal cooling circuit, including: (1) a stainless steel water feed manifold, (2) a stainless steel water return manifold, (3) stainless steel connections between manifolds and barrels, and (4) manual valves.

Preferably, the first module 26 is outfitted with a feeding port 28 for accepting the rawhide starting material from the pump 14. Each of the heating zone modules 26 are provided with two plugged holes 30 which may be adapted for the addition of additives by liquid injection or for the use of a transducer pressure or temperature gauge. The injection of liquid additives can be accomplished by a metering pump with approximately 10 bar pressure.

Optionally, one of the heating zone modules 26 is a degassing barrel with a vacuum to facilitate the removal of water from the scrap rawhide.

The extruder is preferably also capable of being run at high pressure continuously, preferably up to 200 bar. In the instant invention the preferred pressure is approximately 20 bar.

Optionally, wet additives, such as coloring, flavorings, moisture retainers (including, but not limited to, polypropylene glycol) and mold inhibitors (such as potassium sorbate), or dry additives, such as color powder, onion powder or meat or bacon bits, can be added to the rawhide 10 and will result in a final extruded product which contains these flavors or colors. Other dry additives, such as vitamins and nutritional supplements are also possible. An apparatus for adding dry additive is shown in FIG. 1. The dry additive 40 is stored in container 42 and is fed into the extruder by a pump 44. The pump 44 is preferably a twin screw feeder.

While the dry additives can be added at any time during the process, preferably the dry additives are added at the same time as the scrap rawhide 10 (from different sources) and both these constituents make up the starting material. Both the scrap rawhide and the dry additives are fed into the barrel by means of a twin screw feeder. This feeder consists of a bin which contains a pair of intermeshing screws which can be run at variable speeds. By varying the speed, the quantity of dry additive can be varied as a percentage of the starting material.

Other possible additives include liquid additives, such as liquid color or liquid aroma. An apparatus for adding liquid additives is shown in FIG. 1. The liquid additive 46 is stored in container 48 and is fed to the extruder by a pump 50. The pump 50 is preferably a metering pump.

Preferably, the barrel 18 may be adapted by the holes 30 to allow the liquid additives to be added at any point along the length of the barrel 18 and during any point of the extrusion process of the rawhide 10.

In the preferred embodiment a metering pump 50 for feeding the desired liquids into the various positions on the barrel 18 is provided. A preferred metering pump is a variable stroke dosing pump, such as model DKM K20, commercially available from Clextral. In the preferred embodiment, a stainless steel tank for holding a supply of the liquid additive is connected to the pump with a filter.

At the exit end of the barrel 18 there is placed a central feed die plate assembly 32 which consists of a central feed front plate 34 and one of a number of interchangeable extrusion dies 36. A thermocouple in the die plate 34 gives the temperature of the product being extruded. The temperature of the end product is a function of the temperatures of the heating zone modules 26 along the length of the barrel. However, it is preferred to use a cooled plate 34 to give the exiting product a better consistency.

Various extrusion dies 36 can be used to form the reconstructed rawhide product into various shapes attractive to pets. Possible die shapes include, but are not limited to, rectangular, tube, flat and sticks with various diameters or other dies shaped to form the extruded rawhide into round bones, strips or square nuggets. As the reconstructed rawhide product is extruded through the die 36, it is received on conveyer belt 38 which carries the product to a cutter for cutting the extruded product into various size pieces. Since the reconstructed rawhide end product is very soft as it exits the extruder, a long die (approximately 400 mm) is used, when the thickness of the product demands greater shaping time.

Soon after the end product exits the die plate in the desired shaped "dough" it becomes rubbery. That point is the best time to cut the end product into sticks, nuggets, chunks or other desired forms.

The resultant reconstructed rawhide product exits the die with a high percentage of water, but can be dried by simply hanging it up in open air. However, because of the high output of the inventive process (up to about 300 lb/hour), space and time can be saved by alternative methods of drying, such as with heat, or in dry or dry cold air.

Once dried, the result is a rawhide pet chew as hard as bone. A possible additional step is the basting or coating of the product with a number of well known mixtures. Without basting or coating, the chew becomes hard, with a shiny, slightly lumpy appearance.

The method according to the invention is further elucidated by the following examples. The extruding machine used in carrying out the examples was the Twin-Screw Cooker Extruder, Model BC 45, available from Clextral Inc. which had 6 heating zones. The screw configuration disclosed above was utilized.

EXAMPLE 1

Scrap rawhide starting material was extruded using the screw configuration disclosed above, with the heating modules set at the following temperatures:

| Zone | 1 | 2 | 3 | 4 | 5 | 6 |
|---|---|---|---|---|---|---|
| Temp. (°C.) | 25 | 61 | 123 | 122 | 53 | 41 |

The die temperature was 42° C., the pressure bearing was 24/04 psi/bar. The current to the screw was 22 amps and the screws were run at 350 RPM. The throughput of rawhide extruded product was 171 lb/hr. The final product was 100% rawhide.

EXAMPLE 2

Scrap rawhide starting material was extruded using the screw configuration disclosed above, with the heating modules set at the following temperatures:

| Zone | 1 | 2 | 3 | 4 | 5 | 6 |
|---|---|---|---|---|---|---|
| Init. Temp. (°C.) | 0 | 60 | 120 | 120 | 40 | 20 |
| Final Temp. (°C.) | 26 | 59 | 120 | 110 | 60 | 40 |

The die temperature was 37° C., the pressure bearing was 96/5 psi/bar. The current to the screw was 15 amps and the screws were run at 350 RPM. The rawhide feeder pump was run at 210 lb/hr.

EXAMPLE 3

Scrap rawhide starting material was extruded using the screw configuration disclosed above, with the heating modules set at the following temperatures:

| Zone | 1 | 2 | 3 | 4 | 5 | 6 |
|---|---|---|---|---|---|---|
| Init. Temp. (°C.) | 0 | 60 | 120 | 119 | 40 | 20 |
| Final Temp. (°C.) | 26 | 59 | 119 | 108 | 49 | 40 |

A die for forming a strip product was used. The die temperature was 38° C., the pressure bearing was 100/5 psi/bar. The current to the screw was 15 amps and the screws were run at 450 RPM. The throughput of rawhide extruded product was 283 lb/hr. The rawhide pump was run at 300 lb/hr. The extruded product was a 100% rawhide product in strip form.

EXAMPLE 4

A starting material of 80% rawhide scrap and 20% dry additives was extruded using the screw configuration disclosed above, with the heating modules set at the following temperatures:

| Zone | 1 | 2 | 3 | 4 | 5 | 6 |
|---|---|---|---|---|---|---|
| Init. Temp. (°C.) | 0 | 60 | 120 | 120 | 40 | 40 |
| Final Temp. (°C.) | 26 | 60 | 119 | 119 | 54 | 44 |

The die temperature was 44° C., the pressure bearing was 60/06 psi/bar. The current to the screw was 20 amps and the screws were run at 350 RPM. The feeder for feeding the dry additives was run at 4 RPM. The throughput of rawhide extruded product was 216 lb/hr. The preconditioner was run at 210 RPM. The makeup of the end product was 80% reconstituted rawhide and the remainder dry additives. The extruded product retained its shape and became consistent after one-half hour.

EXAMPLE 5

A starting material of 83% rawhide scrap and 17% dry additives was extruded using the screw configuration disclosed above. The die temperature was 41° C., the pressure bearing was 80/06 psi/bar. The current to the screw was 26 amps and the screws were run at 350 RPM. The feeder for the dry additives was run at 4 RPM. The throughput of rawhide extruded product was 202.2 lb/hr. The makeup of the end product was 83% reconstituted rawhide and the remainder dry additives.

EXAMPLE 6

Scrap rawhide starting material was extruded using the screw configuration disclosed above, with the heating modules set at the following temperatures:

| Zone | 1 | 2 | 3 | 4 | 5 | 6 |
|---|---|---|---|---|---|---|
| Init. Temp. (°C.) | 0 | 60 | 120 | 120 | 40 | 20 |
| Final Temp. (°C.) | 34 | 60 | 120 | 116 | 47 | 37 |

Yellow coloring was added to the extruded product by injecting a water and color mix. A die for forming a strip product was used. The die temperature was 40° C., the pressure bearing was 100/5 psi/bar. The current to the screw was 20 amps and the screws were run at 350 RPM. The throughput of rawhide extruded product was 185 lb/hr. The rawhide pump was run at 210 lb/hr. The extruded product was a yellow rawhide product in a strip form.

Many other types of substantially pure rawhide products, free of fillers, can be produced with the methods of the instant invention. For instance, extruded rawhide product can be produced by the coextrusion of a pipe shaped outer shell of pure rawhide which surrounds an interior round strip of rawhide. Using this method, rawhide treats can be manufactured which resemble bones containing marrow.

The coextruded product is manufactured using the fillerless process of the present invention to transform rawhide scraps into a coherent mass of substantially pure rawhide in a tube-like outer shell. Any of the additives and flavorings discussed above can be used in the outer shell. Through the use of a coextrusion die and a second twin screw extruder, a soft filling, also made of substantially pure extruded rawhide by way of the present invention, is co-extruded into the outer shell.

Preferably, the flavoring and additives can be added to the inner filling. Preferably, the inner filling can be kept soft and moist by the addition of polypropylene glycol and potassium sorbate. Because the product consists almost exclusively of reconstituted rawhide scrape, with no filler, the end product will therefore last much longer than the previously available pet chews. Further, this is an inexpensive way to provide a solid chew.

Alternatively, a beef jerky mix, or some other material is simply pumped into the outer shell at the die plate by the use of a pump, simple extruder or another twin screw extruder.

Drying and cutting of the coextruded product is similar to the processes described above.

It will be apparent to one skilled in the art that various modifications and equivalents may be employed in practicing this invention. No limitations are to be inferred or implied except as set forth in the claims.

We claim:

1. A method of manufacturing a substantially pure rawhide pet product comprising:
    (a) providing a substantially pure rawhide which has not been substantially dehydrated,
    (b) heating said rawhide, and
    (c) extruding said rawhide through a double screw extruder with a die plate.

2. The method of claim 1 wherein said rawhide is rawhide scrap.

3. The method of claim 1 wherein said rawhide is provided with dry additives.

4. The method of claim 1 wherein said rawhide is heated in a plurality of sequentially spaced heating zones.

5. The method of claim 4 wherein said plurality of sequentially spaced heating zones comprises a first heating zone, said first heating zone comprising a means for inputing said rawhide.

6. The method of claim 4 wherein each of said heating zones comprises a means for the addition of liquid additives.

7. The method of claim 4 wherein said plurality of sequentially spaced heating zones comprises a last heating zone, wherein said last heating zone is maintained at a temperature of approximately 50° C.

8. The method of claim 4 wherein one of said sequentially spaced heating zones is a degassing zone.

9. A method of manufacturing a rawhide pet product comprising:
    (a) providing a substantially pure rawhide which has not been substantially dehydrated,
    (b) heating said rawhide,
    (c) extruding said rawhide through a double screw extruder and a die plate, wherein said double screw extruder comprises: a pair of shafts, and a plurality of interchangeable elements assembled on said shafts.

10. The method of claim 9 wherein the interchangeable elements are chosen from a group of elements which includes moll mixing discs.

11. The method of claim 10 wherein said plurality of interchangeable elements are assembled on said shafts to provide a screw profile which comprises two mixing sections of mell mixing discs and a reverse section.

12. The method of claim 1 wherein said extrusion step comprises shearing, mixing and kneading said rawhide so that it is formed into a coherent mass.

13. A substantially pure rawhide product for pets, manufactured by a method comprising:
    (a) providing a substantially pure rawhide which has not been substantially dehydrated,
    heating said rawhide, and
    extruding said rawhide through a double screw extruder and a die plate.

14. A method of manufacturing a substantially pure rawhide pet product comprising:
    (a) providing a first batch of substantially pure rawhide which has not been substantially dehydrated,
    (b) heating said rawhide,
    (c) extruding said rawhide through a first double screw extruder and a coextrusion die into a tube,
    (d) providing a second batch of substantially pure rawhide which has not been substantially dehydrated,
    (e) heating said second batch of rawhide, and
    (f) extruding said second batch of rawhide with a second double screw extruder through said coextrusion die such that the extruded rawhide fills the tube.

15. The method of claim 14, wherein said second batch of rawhide includes polypropylene glycol and potassium sorbate.

16. A method of manufacturing a rawhide product comprising coextruding a tube of substantially pure rawhide and a filler that comprises substantially pure rawhide.

* * * * *